United States Patent
Yoshioka et al.

(10) Patent No.: US 10,544,021 B2
(45) Date of Patent: Jan. 28, 2020

(54) INDUSTRIAL VEHICLE AND LIGHTING DEVICE

(71) Applicant: Mitsubishi Logisnext Co., Ltd., Kyoto (JP)

(72) Inventors: Masahiro Yoshioka, Kyoto (JP); Makoto Torikawa, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 0 days.

(21) Appl. No.: 16/269,617

(22) Filed: Feb. 7, 2019

(65) Prior Publication Data
US 2019/0300347 A1 Oct. 3, 2019

(30) Foreign Application Priority Data
Mar. 27, 2018 (JP) .................................. 2018-059490

(51) Int. Cl.
*B66F 9/075* (2006.01)
*B60Q 1/04* (2006.01)

(52) U.S. Cl.
CPC ........ *B66F 9/07504* (2013.01); *B60Q 1/0483* (2013.01); *B66F 9/07545* (2013.01)

(58) Field of Classification Search
CPC . B66F 9/07504; B66F 9/07545; B60Q 1/0483
See application file for complete search history.

(56) References Cited

U.S. PATENT DOCUMENTS

| | | | | |
|---|---|---|---|---|
| 4,987,522 A | * | 1/1991 | Miyano | ..................... B60Q 1/24 280/756 |
| 2012/0140497 A1 | | 6/2012 | Walesa | |
| 2017/0015368 A1 | * | 1/2017 | Miyazaki | ............. B62D 21/186 |

FOREIGN PATENT DOCUMENTS

| | | |
|---|---|---|
| JP | S48-19515 | 6/1973 |
| JP | H02-86834 | 7/1990 |
| JP | H03-025038 | 2/1991 |
| JP | H07-172231 | 7/1995 |

OTHER PUBLICATIONS

Official action dated Feb. 27, 2019 in corresponding Japanese Application No. 2018-059490.

* cited by examiner

*Primary Examiner* — Joseph L Williams
*Assistant Examiner* — Jose M Diaz
(74) *Attorney, Agent, or Firm* — Kirschstein, Israel, Schiffmiller & Pieroni, P.C.

(57) ABSTRACT

An industrial vehicle includes a vehicle body, a head guard provided in the upper portion of the vehicle body, and a lighting device provided on the head guard and illuminating a space in front of the vehicle body. The lighting device is provided with a light illuminating the space in front of the vehicle body and brackets removably attached to a pipe of the head guard. The light is attached to the bracket so as to be positioned below the pipe and positioned beside or behind a front pillar of the head guard.

5 Claims, 7 Drawing Sheets

INDUSTRIAL VEHICLE AND LIGHTING DEVICE

BACKGROUND OF THE INVENTION

1. Field of the Invention

The present invention relates to an industrial vehicle and a lighting device.

2. Description of the Related Art

In general, an industrial vehicle such as a forklift is equipped with a lighting device. The lighting device illuminates a space in front of the vehicle and informs a worker around the vehicle of the presence of the vehicle.

In a conventional forklift, the lighting device is provided above a roof constituting a head guard (see, for example, JP 2-86834 Y) or the lighting device is provided in front of a front pillar constituting a head guard (see, for example, JP 3-25038 A). In both cases, the lighting device is provided outside the head guard, and thus a problem arises with the presence of the lighting device impairing the appearance of the forklift.

In addition, in the forklift that is described in JP 2-86834 Y a hole for lighting device attachment is formed in the roof, which results in a problematic decline in roof strength.

In the forklift described in JP 3-25038 A, the lighting device is attached by welding, and thus a problem arises as the lighting device cannot be removed.

SUMMARY OF THE INVENTION

The invention has been made in view of the above circumstances, and an object of the invention is to provide an industrial vehicle and a lighting device not impaired in terms of appearance.

In order to solve the above problem, an industrial vehicle according to the invention includes a vehicle body, a head guard provided in an upper portion of the vehicle body, and a lighting device provided on the head guard and illuminating a space in front of the vehicle body. The head guard includes a pair of right and left front pillars provided in a front portion of the vehicle body and a roof covering an upper part of the vehicle body. The roof has a pipe extending in a right-left direction of the vehicle body between the pair of right and left front pillars. The lighting device includes a light illuminating the space in front of the vehicle body and a bracket removably attached to the pipe. The light is attached to the bracket so as to be positioned below the roof and positioned beside or behind the pair of right and left front pillars.

In the industrial vehicle described above, the bracket may have a first bracket having a lower side to which the light is attached, a second bracket sandwiching the pipe with the first bracket, and fixing means for fixing the first bracket and the second bracket in a state where the pipe is sandwiched.

In the industrial vehicle described above, the pipe may have an upper surface, a lower surface, a front surface, and a rear surface. The first bracket may have an upper surface portion, a rear surface portion extending downwards from a rear end of the upper surface portion and facing the rear surface of the pipe, and a lower surface portion extending forwards from a lower end of the rear surface portion and facing the lower surface of the pipe. The upper surface portion of the first bracket may have a first upper surface portion facing the upper surface of the pipe and a second upper surface portion extending forwards from a front end of the first upper surface portion, the light being attached to the second upper surface portion. The second bracket may have a third upper surface portion facing the second upper surface portion on a lower side of the second upper surface portion and a front surface portion extending downwards from a rear end of the third upper surface portion and facing the front surface of the pipe. The fixing means may fix the second upper surface portion and the third upper surface portion in a state of being sandwiched in an upward-downward direction.

In the industrial vehicle described above, the upper surface portion of the first bracket may have a notch on the rear end side and a length of the first upper surface portion in the right-left direction may be shorter than a length of the second upper surface portion in the right-left direction.

The industrial vehicle described above may include a first buffer material provided between the rear surface portion of the first bracket and the rear surface of the pipe and a second buffer material provided between the front surface portion of the second bracket and the front surface of the pipe.

In order to solve the above problem, a lighting device according to the invention, which is attached to a pipe, includes a light performing forward illumination and a bracket removably attached to the pipe. The bracket includes a first bracket having a lower side to which the light is attached, a second bracket sandwiching the pipe with the first bracket, and fixing means for fixing the first bracket and the second bracket in a state where the pipe is sandwiched.

In the lighting device described above, the first bracket may have an upper surface portion, a rear surface portion extending downwards from a rear end of the upper surface portion, and a lower surface portion extending forwards from a lower end of the rear surface portion. The upper surface portion of the first bracket may have a first upper surface portion and a second upper surface portion extending forwards from a front end of the first upper surface portion, the light being attached to the second upper surface portion. The second bracket may have a third upper surface portion facing the second upper surface portion on a lower side of the second upper surface portion and a front surface portion extending downwards from a rear end of the third upper surface portion. The fixing means may fix the second upper surface portion and the third upper surface portion in a state of being sandwiched in an upward-downward direction.

In the lighting device described above, the upper surface portion of the first bracket may have a notch on the rear end side and a length of the first upper surface portion in a right-left direction may be shorter than a length of the second upper surface portion in the right-left direction.

According to the invention, it is possible to provide an industrial vehicle and a lighting device not impaired in terms of appearance.

DETAILED DESCRIPTION OF THE PREFERRED EMBODIMENTS

Hereinafter, an embodiment of an industrial vehicle and a lighting device according to the invention will be described with reference to accompanying drawings. Regarding the embodiment of the industrial vehicle, a forklift will be described as an example. The following upward-downward, right-left, and forward-rearward directions are based on the vehicle body of the forklift.

Figure 1:
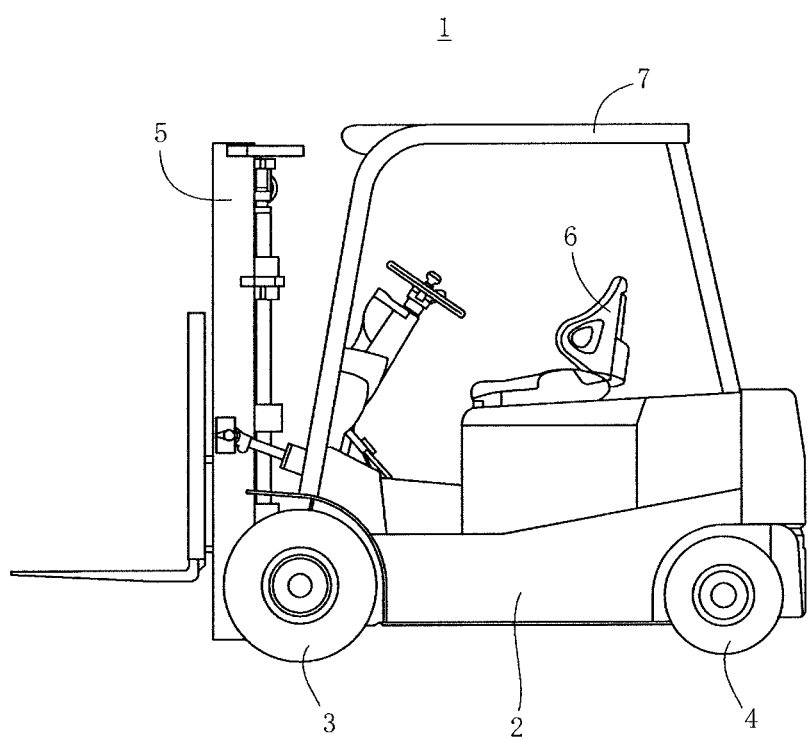
FIG. 1 is a side view of a forklift according to an embodiment of the invention.

FIG. 1 is a side view illustrating a forklift 1 as an embodiment of the industrial vehicle according to the invention. The forklift 1 is provided with a vehicle body 2, a front wheel 3 provided on the lower front side of the vehicle body 2, a rear wheel 4 provided on the lower rear side of the vehicle body 2, and a cargo handling apparatus 5 provided in the front portion of the vehicle body 2.

The cargo handling apparatus 5 includes each cylinder (a lift cylinder, a tilt cylinder, and a reach cylinder), a carriage, a pair of right and left masts erected on the carriage, and a pair of right and left forks attached to the masts so as to be movable up and down. For example, the lift cylinder raises and lowers the forks, the tilt cylinder tilts the forks, and the reach cylinder moves the carriage back and forth.

The forklift 1 is provided with a driver's seat 6 and a head guard 7 provided in the upper portion of the vehicle body 2. A steering wheel, an accelerator lever, cargo handling levers (a lift lever, a tilt lever, and a reach lever), and the like are provided in front of the driver's seat 6.

Figure 2:
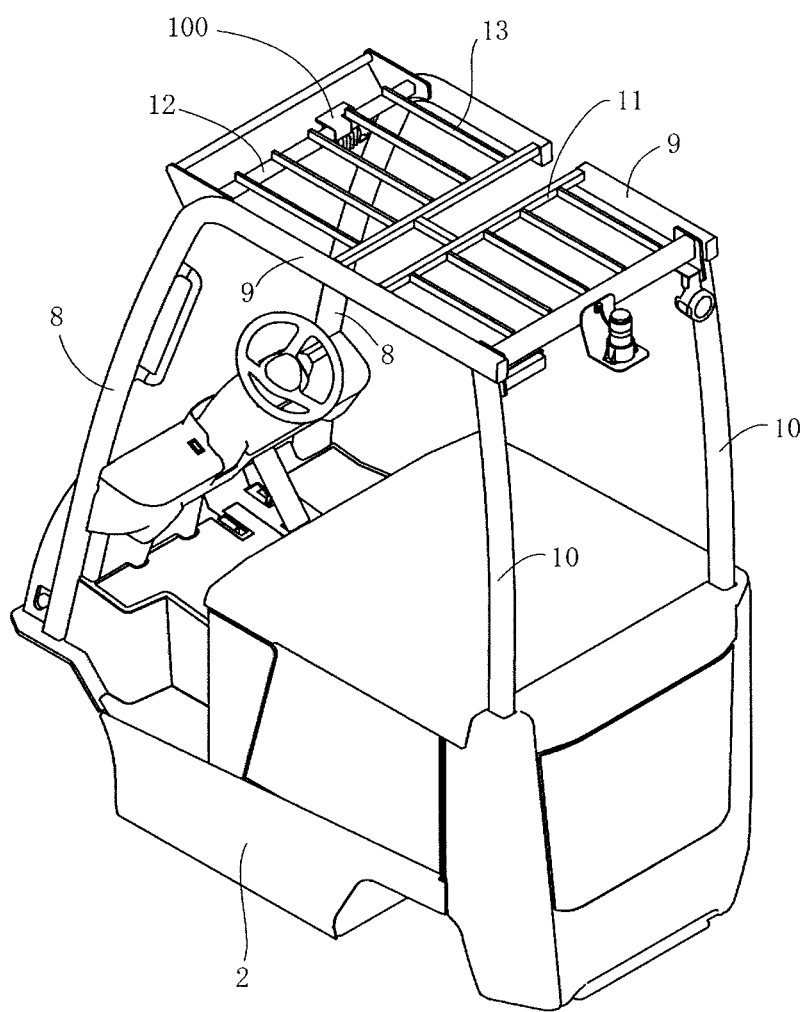
FIG. 2 is a perspective view of the vehicle body structure of the forklift according to the embodiment of the invention.

FIG. 2 is a perspective view illustrating the vehicle body structure of the forklift 1. The front wheel 3, the rear wheel 4, the cargo handling apparatus 5, and the driver's seat 6 are not illustrated in FIG. 2. The head guard 7 provided in the upper portion of the vehicle body 2 includes a pair of right and left front pillars 8, a pair of right and left side beams 9, a pair of right and left rear pillars 10, and a roof 11.

A rectangular pipe member extending in the upward-downward direction constitutes the front pillar 8. The lower end of the front pillar 8 is provided in the front portion of the vehicle body 2. The upper end of the front pillar 8 is positioned slightly behind the lower end of the front pillar 8. A headlight (not illustrated) is attached to each front pillar 8. The headlight emits, for example, white light and illuminates the space in front of the vehicle body 2 over a relatively wide range.

A rectangular pipe member extending in the forward-rearward direction constitutes the side beam 9. The front end of the side beam 9 is continuous with the upper end of the front pillar 8. In other words, a series of pipe members constitutes the front pillar 8 and the side beam 9. The side beam 9 on the right side is separated in the forward-rearward direction with a gap formed in the middle in the forward-rearward direction. Incidentally, a series of pipe members may form the side beam 9 and the rear pillar 10.

A rectangular pipe member extending in the upward-downward direction constitutes the rear pillar 10. The lower end of the rear pillar 10 is provided in the rear portion of the vehicle body 2, and the upper end of the rear pillar 10 is in contact with the lower side of the rear end portion of the side beam 9. The upper end of the rear pillar 10 is positioned slightly ahead of the lower end of the rear pillar 10.

The roof 11 is provided with a plurality of first pipes extending in the right-left direction between the front pillars 8. A rectangular pipe 12, which is one of the first pipes, is positioned in the front end portion of the side beam 9, and a lighting device 100 according to one embodiment of the invention is attached to the pipe 12. The roof 11 is provided with a plurality of second pipes 13 extending in the forward-rearward direction in parallel with the side beam 9. The roof 11 is formed in a lattice shape by the plurality of first pipes and the plurality of second pipes 13.

Figure 3:
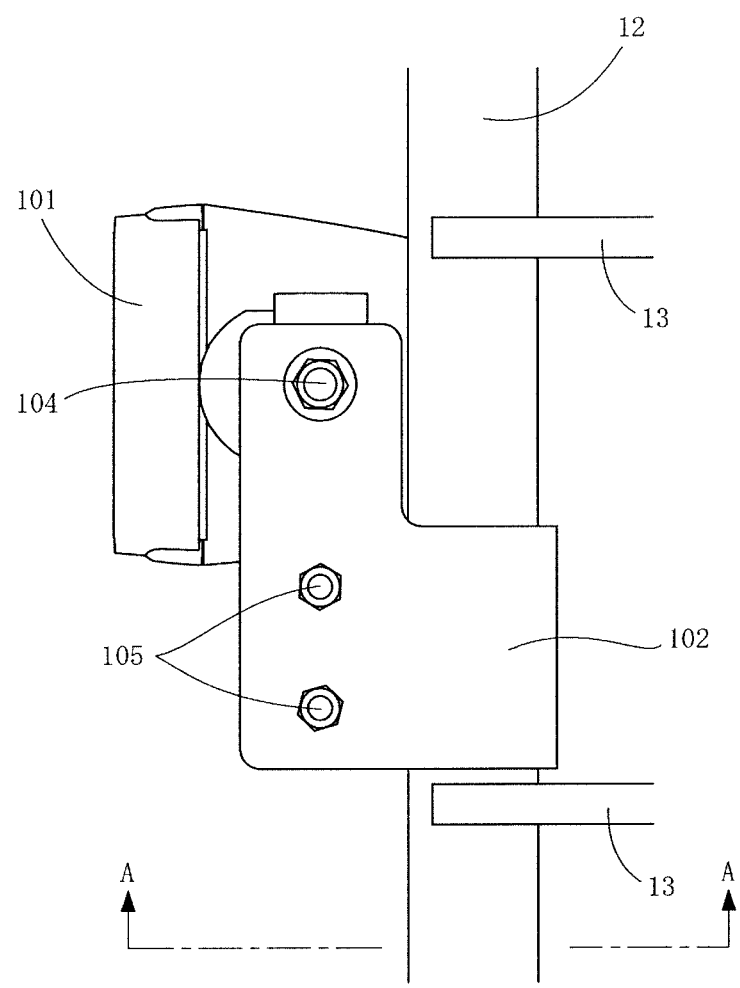
FIG. 3 is a plan view of a lighting device according to the embodiment of the invention.
Figure 4:
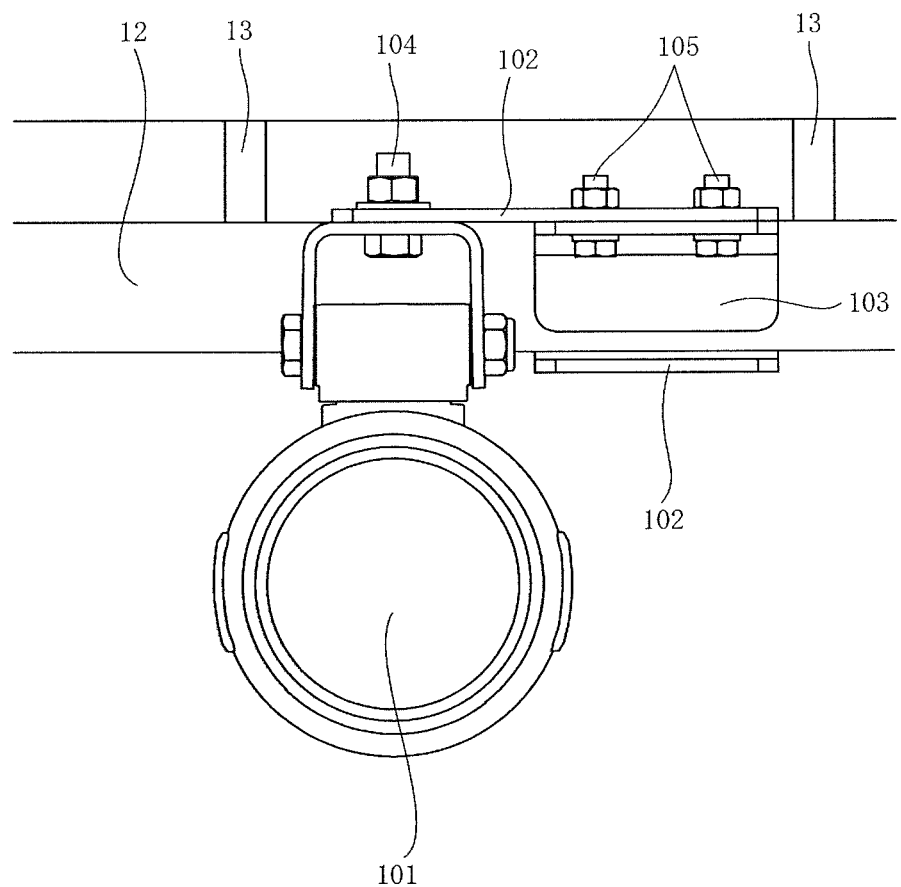
FIG. 4 is a front view of the lighting device according to the embodiment of the invention.
Figure 5:
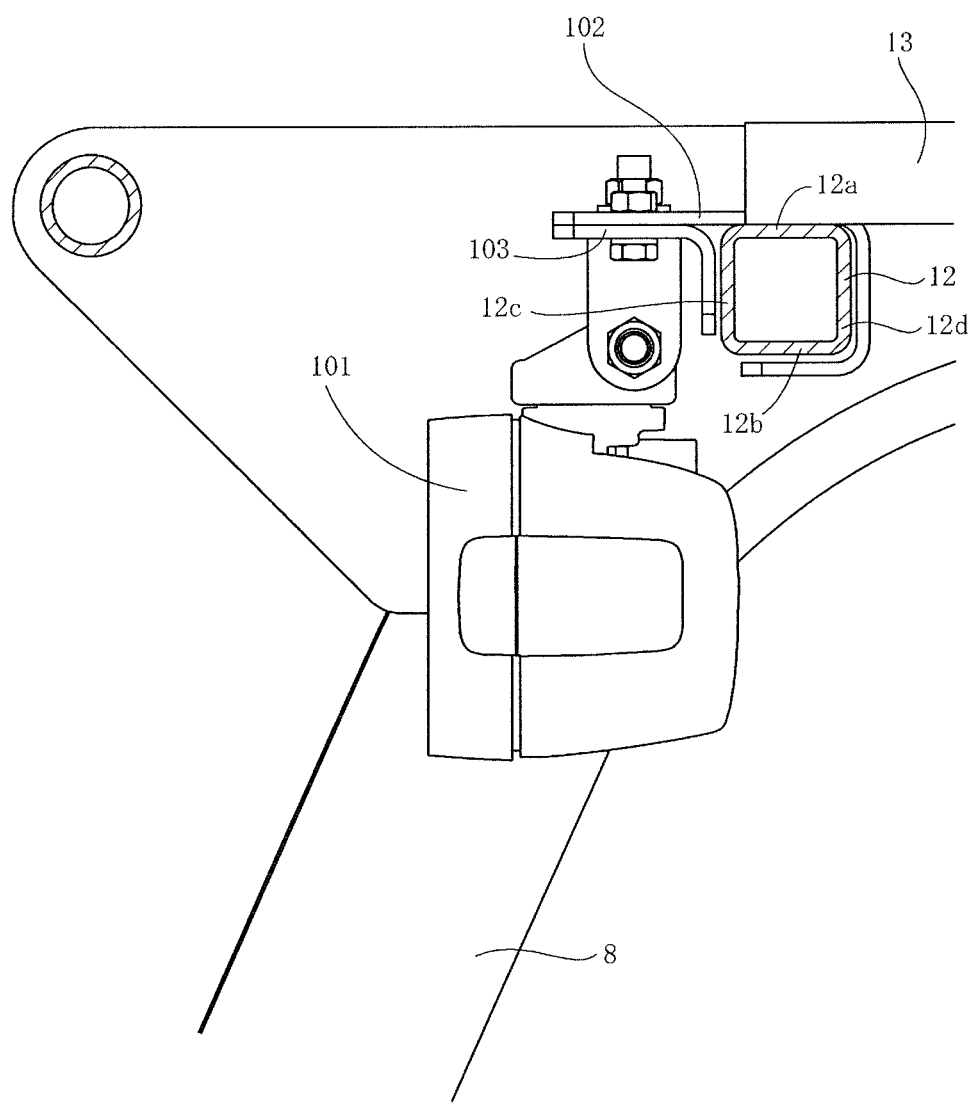
FIG. 5 is a side view of the lighting device according to the embodiment of the invention.

The lighting device 100 according to one embodiment of the invention is illustrated in FIGS. 3 to 5. FIG. 3 is a plan view, FIG. 4 is a front view, and FIG. 5 is a cross-sectional view taken along line A-A of FIG. 3. As illustrated in FIGS. 3 to 5, the lighting device 100 is provided with a light 101 illuminating the space in front of the vehicle body 2 and a bracket removably attached to the pipe 12.

The light 101 emits blue light so as to inform a worker around the vehicle of the presence of the vehicle. The illumination range of the light 101 is narrower than the illumination range of the headlight. The light 101 includes, for example, at least one blue light emitting diode. The light 101 is attached to the bracket so as to be positioned below the pipe 12 and to be positioned beside the pair of right and left front pillars 8. In other words, the light 101 fits inside the head guard 7.

The bracket is provided with a first bracket 102, a second bracket 103, first fixing means 104, and second fixing means 105. The first fixing means 104 includes, for example, a shaft portion such as a bolt and a fixing portion such as a nut. The second fixing means 105 includes, for example, a shaft portion such as a bolt and a fixing portion such as a nut.

Figure 6:
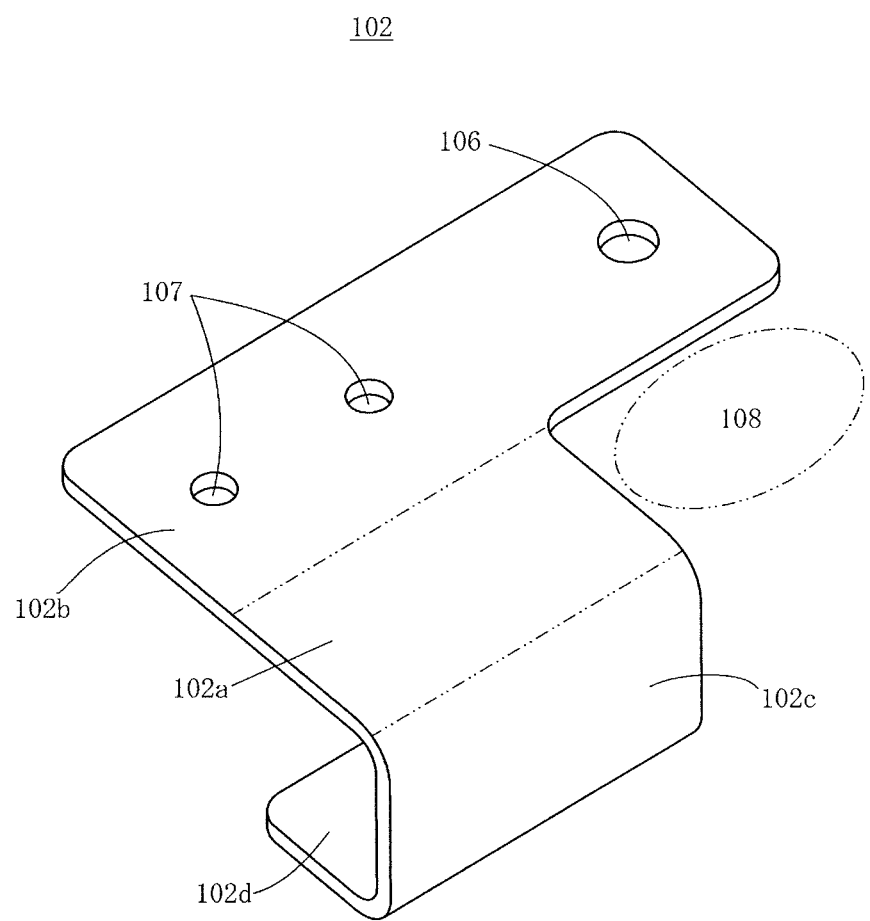
FIG. 6 is a perspective view of a first bracket according to the embodiment of the invention.

FIG. 6 is a perspective view of the first bracket 102. The first bracket 102 has an upper surface portion including a first upper surface portion 102a and a second upper surface portion 102b, a rear surface portion 102c, and a lower surface portion 102d.

As illustrated in FIG. 5, the first upper surface portion 102a faces an upper surface 12a of the pipe 12. The second upper surface portion 102b extends forwards from the front end of the first upper surface portion 102a and has at least one first hole portion 106 (one in the present embodiment) and at least one second hole portion 107 (two in the present embodiment).

The first hole portion 106 is larger in size than the shaft portion of the first fixing means 104 and smaller in size than the fixing portion of the first fixing means 104. The second hole portion 107 is larger in size than the shaft portion of the second fixing means 105 and smaller in size than the fixing portion of the second fixing means 105.

The upper surface portion including the first upper surface portion 102a and the second upper surface portion 102b has a notch 108 on the rear end side, and the length of the first upper surface portion 102a in the right-left direction is shorter than the length of the second upper surface portion 102b in the right-left direction. In addition, as illustrated in FIG. 3, the length of the first upper surface portion 102a in the right-left direction is shorter than the distance between the adjacent second pipes 13. The lighting device 100 has the notch 108, and thus the degree of freedom in terms of position of attachment to the pipe 12 increases. In other words, the position of the lighting device 100 in the right-left direction can be changed until the first upper surface portion 102a comes into contact with the second pipe 13.

The rear surface portion 102c extends downwards from the rear end of the first upper surface portion 102a and faces a rear surface 12d of the pipe 12. The lower surface portion 1024 extends forwards from the lower end of the rear surface portion 102c and faces a lower surface 12b of the pipe 12.

Figure 7:
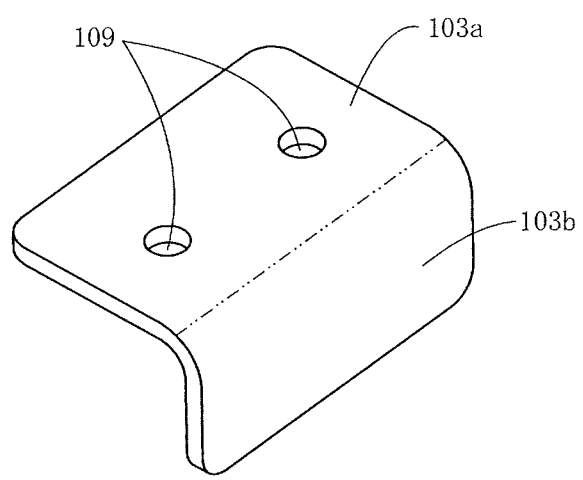
FIG. 7 is a perspective view of a second bracket according to the embodiment of the invention.

FIG. 7 is a perspective view illustrating the second bracket 103. The second bracket 103 sandwiches the pipe 12 with the first bracket 102. The second bracket 103 has a third upper surface portion 103a and a front surface portion 103b. The lengths of the third upper surface portion 103a and the front surface portion 103b in the right-left direction are equal to the lengths of the first upper surface portion 102a and the rear surface portion 102c of the first bracket 102 in the right-left direction.

The third upper surface portion 103a has at least one third hole portion 109 (two in the present embodiment). The third hole portion 109 is equal in number and size to the second hole portion 107 of the first bracket 102. The third upper surface portion 103a faces the second upper surface portion 102b on the lower side of the second upper surface portion 102b of the first bracket 102 such that the third hole portion 109 and the second hole portion 107 overlap. The front surface portion 103b extends downwards from the rear end of the third upper surface portion 103a and faces a front surface 12c of the pipe 12.

The first fixing means 104 fixes the first bracket 102 and the light 101. The second fixing means 105 fixes the first bracket 102 and the second bracket 103 in a state where the pipe 12 is sandwiched.

More specifically, the shaft portion of the second fixing means 105 (such as the shaft portion of the bolt) is inserted through the second hole portion 107 and the third hole portion 109. The fixing portion of the second fixing means 105 (such as the head portion of the bolt and the nut) fixes the first bracket 102 and the second bracket 103 in a state where the second upper surface portion 102b of the first bracket 102 and the third upper surface portion 103a of the second bracket 103 are sandwiched in the upward-downward direction.

Although not illustrated in FIG. 5, the lighting device 100 may be provided with a first buffer material provided between the rear surface portion 102c of the first bracket 102 and the rear surface 12d of the pipe 12 and a second buffer material provided between the front surface portion 103b of the second bracket 103 and the front surface 12c of the pipe 12. The first buffer material is made of, for example, rubber and fills the gap between the rear surface portion 102c of the first bracket 102 and the rear surface 12d of the pipe 12. The second buffer material is made of, for example, rubber and fills the gap between the front surface portion 103b of the second bracket 103 and the front surface 12c of the pipe 12.

Incidentally, the lighting device 100 may be further provided with a third buffer material provided between the first upper surface portion 102a of the first bracket 102 and the upper surface 12a of the pipe 12 and a fourth buffer material provided between the lower surface portion 102d of the first bracket 102 and the lower surface 12b of the pipe 12.

In the forklift 1 and the lighting device 100 according to the present embodiment, the light 101 is positioned below the roof 11 and is positioned beside the pair of right and left front pillars 8. In other words, in the forklift 1 and the lighting device 100 according to the present embodiment, the light 101 is provided inside the head guard 7, and thus the presence of the lighting device 100 does not impair the appearance of the forklift 1.

In the forklift 1 and the lighting device 100 according to the present embodiment, the lighting device 100 is attached to the head guard 7 by the pipe 12 being sandwiched by the first bracket 102 and the second bracket 103 with no processing applied to the head guard 7. Accordingly, in the forklift 1 and the lighting device 100 according to the present embodiment, it is possible to suppress a decline in the strength of the head guard 7 attributable to attachment of the lighting device 100.

In the forklift 1 and the lighting device 100 according to the present embodiment, the lighting device 100 can be easily removed from the head guard 7 and the removed lighting device 100 can be attached to any position of the pipe 12 of the head guard 7.

Hereinbefore, the embodiments of the industrial vehicle and the lighting device according to the invention have been described, but the invention is not limited to the above-described embodiment.

The industrial vehicle of the invention may not be a forklift insofar as the vehicle is provided with a vehicle body, a head guard provided in the upper portion of the vehicle body, and a lighting device (a light and a bracket) for forward illumination provided on the head guard. In the industrial vehicle of the invention, the bracket may be removably attached to the pipe of the head guard and the light may be attached to the bracket so as to be positioned below the roof of the head guard and to be positioned beside or behind the front pillar of the head guard.

The lighting device of the invention may be provided with a light for forward illumination and a bracket removably attached to a pipe. Preferably, in the lighting device of the invention, the bracket is provided with a first bracket having a lower side to which the light is attached, a second bracket sandwiching the pipe with the first bracket, and fixing means for fixing the first bracket and the second bracket in a state where the pipe is sandwiched.

The first bracket, the second bracket, and the fixing means can be appropriately changed in configuration.

What is claimed is:
1. An industrial vehicle comprising:
a vehicle body;
a head guard provided in an upper portion of the vehicle body; and
a lighting device provided on the head guard and illuminating a space in front of the vehicle body,
wherein the head guard includes a pair of right and left front pillars provided in a front portion of the vehicle body, and a roof covering an upper part of the vehicle body,
wherein the roof has a pipe extending in a right-left direction of the vehicle body between the pair of right and left front pillars,
wherein the lighting device includes a light illuminating the space in front of the vehicle body, and a bracket removably attached to the pipe,
wherein the light is attached to the bracket so as to be positioned below the roof and positioned beside or behind the pair of right and left front pillars,
wherein the bracket has a first bracket having a lower side to which the light is attached, a second bracket sandwiching the pipe with the first bracket, and fixing means for fixing the first bracket and the second bracket in a state where the pipe is sandwiched,
wherein the pipe has an upper surface, a lower surface, a front surface, and a rear surface,
wherein the first bracket has an upper surface portion, a rear surface portion extending downwards from a rear end of the upper surface portion and facing the rear surface of the pipe, and a lower surface portion extending forwards from a lower end of the rear surface portion and facing the lower surface of the pipe, wherein the upper surface portion of the first bracket has a first upper surface portion facing the upper surface of the pipe, and a second upper surface portion extending forwards from a front end of the first upper surface portion, wherein the light is attached to the second upper surface portion, wherein the second bracket has a third upper surface portion facing the second upper surface portion on a lower side of the second upper surface portion, and a front surface portion extending downwards from a rear end of the third upper surface portion and facing the front surface of the pipe, and wherein the fixing means fixes the second upper surface portion and the third upper surface portion in a state of being sandwiched in an upward-downward direction.

2. The industrial vehicle according to claim 1, wherein the upper surface portion of the first bracket has a notch on the rear end side, and wherein a length of the first upper surface portion in the right-left direction is shorter than a length of the second upper surface portion in the right-left direction.

3. The industrial vehicle according to claim 2, comprising:
a first buffer material provided between the rear surface portion of the first bracket and the rear surface of the pipe; and
a second buffer material provided between the front surface portion of the second bracket and the front surface of the pipe.

4. A lighting device attached to a pipe, the lighting device comprising:
a light performing forward illumination; and
a bracket removably attached to the pipe,
wherein the bracket includes a first bracket having a lower side to which the light is attached, a second bracket sandwiching the pipe with the first bracket, and fixing means for fixing the first bracket and the second bracket in a state where the pipe is sandwiched,
wherein the first bracket has an upper surface portion, a rear surface portion extending downwards from a rear end of the upper surface portion, and a lower surface portion extending forwards from a lower end of the rear surface portion,
wherein the upper surface portion of the first bracket has a first upper surface portion, and a second upper surface portion extending forwards from a front end of the first upper surface portion,
wherein the light is attached to the second upper surface portion,
wherein the second bracket has a third upper surface portion facing the second upper surface portion on a lower side of the second upper surface portion, and a front surface portion extending downwards from a rear end of the third upper surface portion, and
wherein the fixing means fixes the second upper surface portion and the third upper surface portion in a state of being sandwiched in an upward-downward direction.

5. The lighting device according to claim 4, wherein the upper surface portion of the first bracket has a notch on the rear end side, and wherein a length of the first upper surface portion in a right-left direction is shorter than a length of the second upper surface portion in the right-left direction.

* * * * *